May 3, 1932. M. W. H. WILSON 1,856,145
TAILSTOCK
Filed April 8, 1929
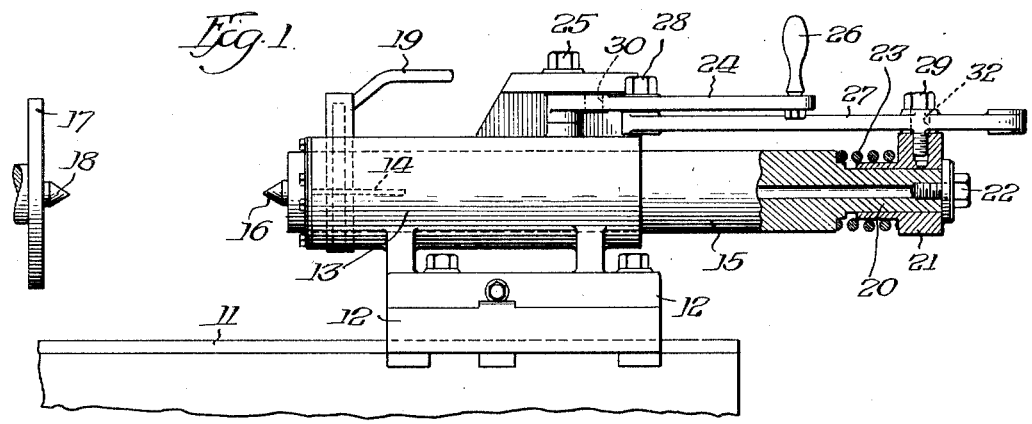
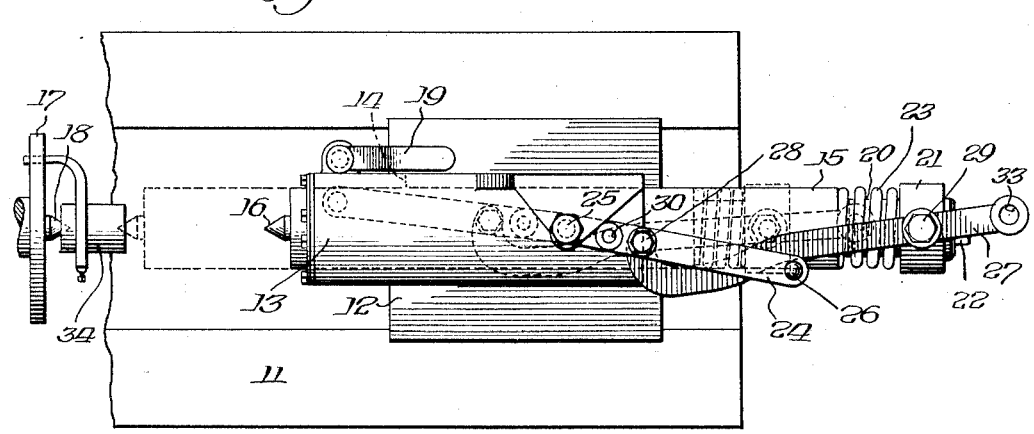
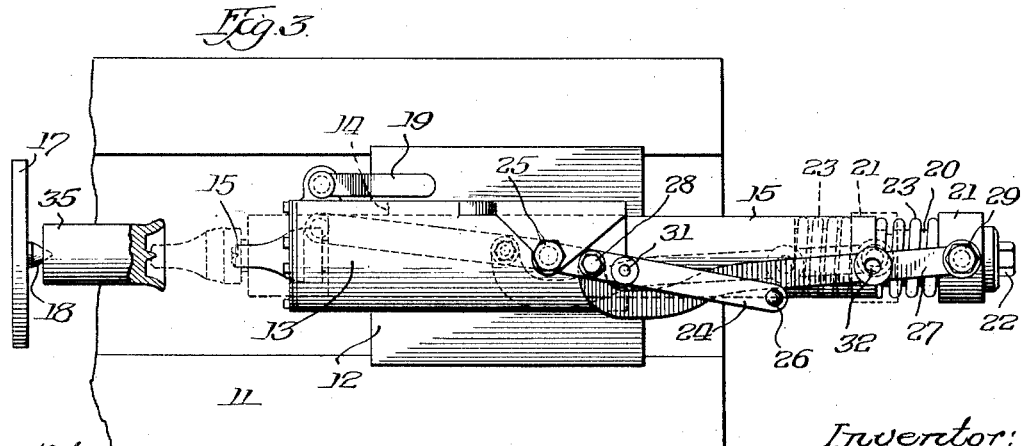
Witness
Geo. C. Davison
Inventor:
Moses W. H. Wilson
By Cromwell, Greist & Warden
Attys Patented May 3, 1932

1,856,145

UNITED STATES PATENT OFFICE

MOSES W. H. WILSON, OF EAST LANSING, MICHIGAN, ASSIGNOR TO MOTOR WHEEL CORPORATION, OF LANSING, MICHIGAN, A CORPORATION OF MICHIGAN

TAILSTOCK

Application filed April 8, 1929. Serial No. 353,294.

My invention has for its object the provision in a tail stock for lathes and the like of means to facilitate the insertion and removal of the work, quickness and accuracy of locking and release, and capacity for and ease of adjustment.

In the accompanying drawings, a tail stock for a centering lathe is shown for purposes of illustration and as forming the basis for the following detailed description of a preferred embodiment of the invention, it being understood that the invention is susceptible of embodiment in structural forms modified from that illustrated, without departure from the essence of the same.

In the drawings,

Fig. 1 is a side elevation of one embodiment with certain portions in vertical section;

Fig. 2 is a top plan view of Fig. 1; and

Fig. 3 is a similar view representing the parts coupled up to give a different adjustment.

The proper operation of a lathe requires not only a secure holding of the work but the manipulation of the tail stock to introduce and remove the work, together with such flexibility as will permit positioning of the centering spindle relative to work varying as to size within a considerable range.

Quickness of clamping and release and ease and accuracy of adjustment relative to the work are of importance, and are the primary factors entering into my invention.

Having reference to the drawings, the bed of the lathe indicated at 11 has mounted thereon in roughly adjusted positions the puppet or block 12 carrying as an integral part the stationary sleeve guide 13, split at one side for a portion of its length as indicated at 14. Within this guide is slidably mounted the spindle 15 which carries at its forward end the tail center 16, the sliding movement of the spindle 15 and the tail center 16 is axially in line with the head stock indicated at 17 and the head center 18. The clamp 19, of well-known construction, serves to clamp the split end of the sleeve guide 13 upon the spindle 15 in adjusted position.

The rear end of the spindle 15 is, in its preferred form, reduced at 20 to receive thereabouts the follower yoke 21, keyed thereon to permit of axial movement only. Movement of the follower upon the spindle to the rear is limited by a retaining screw 22, against which the follower is held by the spring 23 which is interposed between the follower and the abutment formed by the spindle adjacent its reduced portion.

A lever 24 is pivoted at 25 to the stationary sleeve guide and is provided for manual operation with a handle 26. A link 27 is attached to the lever by a pivot 28 and at its opposite end to the follower by a pivot 29. For alternative reception of the pivot 28 the lever is provided with apertures 30 and 31, and for alternative reception of the pivot 29 the link 27 is provided with apertures 32 and 33.

As illustrated in Fig. 1 and in full lines in Fig. 2, the tail stock is in position for receiving the work between its tail center and the head center of the head stock, that is to say retracted from proximity to the head center. In this condition the operating handle 26, the lever 24 and the link 27, as well as the follower and spindle, are at the extreme right.

The work having been placed in position as indicated at 34 in Fig. 2, the workman grasps the handle 26 and swings the same in an arc to the left, thereby causing the link connection with the follower to move the spindle 15 to the left, bringing the tail center into engagement with the work as indicated in dotted lines in Fig. 2. The link 27 is curved at its forward end so that when the lever reaches its extreme forward position, the pivot 28 will have swung past dead center represented by the pivot 25.

The adjustments will have been such that the tail center will contact with the work before the pivot 28 passes dead center, and this to an extent sufficient that the final movement of the lever will compress the spring 23 by the follower 21 so that the work is held between the centers under spring presssure. Thereupon the clamp 19 is actuated to cause the sleeve 13 to grip the spindle 15 positively, thus holding the work rigidly in position for manipulation.

When the work is finished, the loosening of the clamp 19 and the swinging of the lever 24 to the left past dead center permits the spring 23 to relax as the spindle 15 moves to the rear away from the work, thus effecting a quick release.

It will be noted that the travel of the spindle is twice the distance from the pivots 25 to 28, less the compression of the spring 23. The amount of travel is subject to regulation by shifting the pivot 28 from the aperture 31, as shown in Figs. 1 and 2, to the aperture 30, as shown in Fig. 3. This adjustment will correspondingly diminish the to and fro travel of the spindle.

Regardless of the range of the to and fro movement, the degree to which the extremes of such movement are separated from the head center, whereby to accommodate for varying sizes of work, is modified by shifting the pivot 29 from the aperture 32 of the link, as shown in Figs. 1 and 2, to the aperture 33, as shown in Fig. 3, thereby increasing the distance between the foremost position of the tail center and the head center as illustrated in full and in dotted lines in Fig. 3.

It will be observed that by the construction described, a tail stock is provided wherein the work can be quickly positioned and released with a single movement by the operator; that the spring pressure upon the work between the centers is automatically applied and released as the centering spindle itself is moved; also that the range of movement of the tail center is readily susceptible of adjustment as is also the points of extreme movement for the selected range.

I claim:

In a tail stock for lathes, a fixed tubular guide member, a centering spindle, a follower slidable on said spindle, a spring interposed between the follower and an abutment on the spindle, a hand lever pivoted at one end to the guiding member, a link connection pivoted at one end on the follower and at the other end to the hand lever intermediate the ends of the lever, whereby the end of the link connection pivoted to the lever may be swung from a point between the pivot of the lever and the follower to a point on the opposite side of the lever pivot and past dead center to advance the centering spindle and to lock the same in advanced position.

In testimony whereof I have hereunto subscribed my name.

MOSES W. H. WILSON.